(12) United States Patent
Belz et al.

(10) Patent No.: US 8,640,156 B2
(45) Date of Patent: *Jan. 28, 2014

(54) SYSTEMS AND METHOD OF CONTROLLING ACCESS TO MEDIA CONTENT

(71) Applicant: AT&T Intellectual Property I, LP, Atlanta, GA (US)

(72) Inventors: Steven M. Belz, Cedar Park, TX (US); Marc Sullivan, Round Rock, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,661

(22) Filed: Jan. 22, 2013

(65) Prior Publication Data

US 2013/0139197 A1 May 30, 2013

Related U.S. Application Data

(63) Continuation of application No. 11/940,071, filed on Nov. 14, 2007, now Pat. No. 8,402,484.

(51) Int. Cl.
*H04N 7/16* (2011.01)

(52) U.S. Cl.
USPC .................. 725/25; 725/10; 725/16; 725/34; 725/39; 725/80; 725/85; 725/141; 725/142; 725/153; 348/734

(58) Field of Classification Search
None
See application file for complete search history.

(56) References Cited

U.S. PATENT DOCUMENTS

| | | | |
|---|---|---|---|
| 5,410,326 A | 4/1995 | Goldstein | |
| 5,663,756 A | 9/1997 | Blahut et al. | |
| 6,359,661 B1 | 3/2002 | Nickum | |
| 6,426,705 B1 | 7/2002 | Wischoeffer | |
| 7,127,733 B1 | 10/2006 | Ochoa | |
| 2002/0013950 A1 | 1/2002 | Tomsen | |
| 2002/0116500 A1 | 8/2002 | Arora et al. | |
| 2004/0104806 A1 | 6/2004 | Yui et al. | |
| 2005/0097595 A1 | 5/2005 | Lipsanen et al. | |
| 2005/0097612 A1 | 5/2005 | Pearson | |
| 2005/0108751 A1 | 5/2005 | Dacosta | |
| 2005/0157217 A1 | 7/2005 | Hendricks | |
| 2006/0064723 A1 | 3/2006 | Poslinski | |
| 2006/0179452 A1 | 8/2006 | Amodeo et al. | |
| 2007/0038516 A1 | 2/2007 | Apple | |
| 2007/0240182 A1 | 10/2007 | Callahan | |
| 2008/0136664 A1 | 6/2008 | Elsasser | |
| 2008/0141293 A1 | 6/2008 | Blanchard et al. | |

*Primary Examiner* — Jason J Chung
(74) *Attorney, Agent, or Firm* — Guntin & Gust, PLC; Douglas Schnabel (57) ABSTRACT

A system and method of controlling access to media content are disclosed. In one embodiment, the method includes receiving a viewing request at a set-top box device at a user premises. The method also includes retrieving a permission policy stored at the set-top box device and identifying a wireless device associated with the permission policy. Further, the method includes fulfilling the viewing request when the wireless device is present at the user premises and is within a first relative proximity to the set-top box device, and not fulfilling the viewing request when the wireless device is present at the user premises and is within a second relative proximity to the set-top box device.

20 Claims, 7 Drawing Sheets

SYSTEMS AND METHOD OF CONTROLLING ACCESS TO MEDIA CONTENT

CROSS-REFERENCE TO RELATED APPLICATIONS

This application is a continuation of U.S. patent application Ser. No. 11/940,071 filed Nov. 14, 2007, which is incorporated herein by reference in its entirety.

FIELD OF THE DISCLOSURE

The present disclosure generally relates to controlling access to media content received via a communications network, such as a video distribution network.

BACKGROUND OF THE DISCLOSURE

Advances in media content distribution allow media content service providers to provide a broad range of content to households, including video content, music content, other audio content, or any combination thereof. At least a portion of this media content may be inappropriate for some viewers due to violence or language, for example. As a result, users often desire to limit access to certain media content by children or other members of their households.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
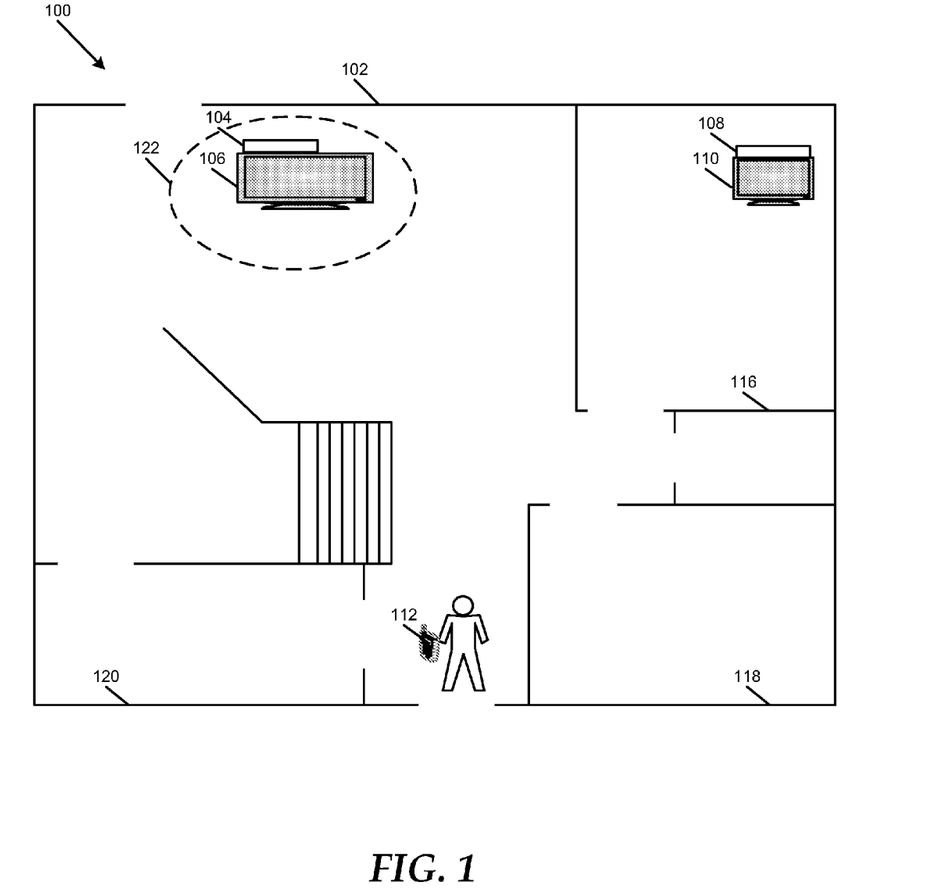
FIG. 1 is a block diagram illustrating a particular embodiment of a system to control access to media content.

FIG. 1 shows a system 100 to control access to media content. The system 100 includes a set-top box device 104 coupled to a display device 106 at a user premises 102. The user premises 102 includes a plurality of rooms, such as the rooms 116, 118 and 120. In one embodiment, a second set-top box device 108 can be coupled to a second display device 110 at the user premises 102. Additional set-top box devices and display devices can be located at the user premises 102. In an illustrative, non-limiting embodiment, the set-top box devices at the user premises 102 can communicate with each other and can be configured to act as a master set-top box device and one or more slave set-top box devices.

In an illustrative embodiment, a set-top box device at the user premises 102, such as the set-top box device 104, is adapted to receive a viewing request. The viewing request can include, for example, a request to power the set-top box device 104 on, a request to remove the set-top box device 104 from a standby state, a request to access a particular channel or a particular plurality of channels, a channel change request, a request to view a portion of an electronic programming guide, or any combination thereof. The set-top box device 104 is adapted to retrieve a permission policy stored at the set-top box device 104, which defines requirements to access certain media content via the set-top box device 104. The requirements relate relative proximities of one or more wireless devices, such as the wireless device 112, to media content access restrictions.

For example, the permission policy can indicate that one or more base television channels, music channels, or a combination thereof (e.g., public broadcasting or children's channels), are accessible via the set-top box device 104, when the wireless device 112 is not present at the user premises 102. In another example, the permission policy may indicate that the set-top box device 104 is not to power on while the wireless device 112 is not at the user premises 102. Further, the permission policy can indicate that one or more particular channels (e.g., major networks or adult contemporary music channels) are accessible when the wireless device 112 is present at the user premises 102 and within a first relative proximity to the set-top box device 104, such as not within a line of sight, within a wireless fidelity (Wi-Fi) range, a wireless area network (WLAN) range, or a class 1 Bluetooth range (e.g., 100 meters).

In other examples, the permission policy can indicate that one or more additional channels (e.g., certain cable networks or popular music channels) are accessible when the wireless device 112 is present at the user premises 102 and within a second relative proximity to the set-top box device 104, such as within a line of sight to the set-top box device 104, within a class 2 Bluetooth range (e.g., 10 meters) of the set-top box device 104, or within an area of a room that includes the set-top box device 104. Moreover, the permission policy can indicate that one or more other channels (e.g., video on demand or cable movie channels) are accessible when the wireless device 112 is present at the user premises 102 and within a contact area of the set-top box device 104, such as contacting the set-top box device or within a class 3 Bluetooth range (e.g., 1 meter) of the set-top box device 104. As a result, the permission policy can define multiple levels of access to media content, where more than one of the levels are associated with relative positions of the wireless device 112 to the set-top box device 104 while at the user premises, such that the set-top box device 104 fulfills or denies viewing requests according to whether the wireless device 112 is, for example, in the same room as the set-top box device 104, in another room, upstairs, or within another relative proximity to the set-top box device 104.

Relative proximities of wireless devices that are required to access media content can be configured by an authorized user, and can include distances measured from a set-top box device, communication ranges measured from a set-top box device, within a line of sight measured from a set-top box device, not within a line of sight measured from a set-top box device, within a contact area of the set-top box device, other relative proximities to a set-top box device, or any combination thereof. The permission policy can specify a relative proximity of the wireless device 112 to the set-top box device that is required to make changes to such relative proximities or other settings associated with the permission policy.

The set-top box device 104 is adapted to identify at least one wireless device associated with the permission policy, such as the wireless device 112. The wireless device 112 can be one of a plurality of types of wireless devices, such as a cellular phone, a mobile phone, a digital music player, a security token device (e.g., a fob or other hardware device), a personal data assistant, a smart phone, a mobile computing device, other currently known or later-developed wireless devices, or any combination thereof.

The set-top box device 104 is adapted to determine whether the identified wireless device 112 is present at the user premises 102. In an illustrative embodiment, the set-top box device 104 can be adapted to send a polling signal or other signal within a range that includes the user premises 102. The set-top box device 104 can be adapted to send the polling signal or other signal according to a signaling protocol indicated by the permission policy for the wireless device 112, such as Wi-Fi, Bluetooth, WLAN, cellular, wireless access protocol (WAP), radio frequency identification (RFID), other currently known or later-developed signaling protocols, or a combination thereof. In one embodiment, the set-top box device 104 can be adapted to act as a picocell device that can communicate with the wireless device 112 via cellular communication over a limited range. The set-top box device 104 can be adapted to determine a presence of the wireless device 112 at the user premises 102 based on an acknowledgement or other response signal received from the wireless device 112 in response to the polling signal. Alternatively, the set-top box device 104 can determine that the wireless device 112 is not present at the user premises 102 if a response signal is not received within a pre-defined time after the polling signal or other signal is sent.

If the set-top box device 104 determines that the wireless device 112 is not present at the user premises 102, the set-top box device 104 can be adapted to not fulfill the viewing request. In one embodiment, the set-top box device 104 can be adapted to determine whether the viewing request exceeds a base level of permissions associated with the permission policy prior to sending the polling signal or other signal, prior to denying the viewing request, or a combination thereof. For example, the viewing request may request a cartoon channel that the base level of permissions indicates is accessible when the wireless device 112 is not present at the user premises 102. In such a case, the set-top box device 104 may be adapted to fulfill the viewing request whether or not the wireless device 112 is present at the user premises 102. If the set-top box device 104 determines that the viewing request is not to be fulfilled when the wireless device 112 is not present at the user premises 102, the set-top box device 104 is adapted to not fulfill the viewing request.

When the wireless device 112 is present at the user premises 102, the set-top box device 104 is adapted to determine a relative proximity of the wireless device 112 to the set-top box device 104 when the viewing request is received at the set-top box device 104. Additionally, the set-top box device 104 is adapted to determine whether the relative proximity of the wireless device 112 to the set-top box device 104 is within a relative proximity required by the permission policy to fulfill the viewing request. For example, the permission policy can require that the wireless device be within a relative proximity 122 of the set-top box device 104 in order to grant access to media content designated by the viewing request. The set-top box device 104 can be adapted to fulfill the viewing request if the wireless device is within the relative proximity 122. Otherwise, the set-top box device 104 can be adapted to not fulfill the viewing request, such as when the wireless device 112 is in room 118 or room 120. In an illustrative embodiment, the set-top box device 104 can be adapted to send a blank screen to the display device 106 when a viewing request is not fulfilled. In another embodiment, the set-top box device 104 can send an error message or a message indicating that access is not authorized to the display device 106.

In another illustrative embodiment, the wireless device 112 can be one of a plurality of wireless devices associated with the permission policy stored at the set-top box device 104. The set-top box device 104 can be adapted to determine whether a first wireless device is present at the user premises 102 and, when the first wireless device is present, to apply a first set of permissions associated with the first wireless device to the viewing request. For example, the first set of permissions can require that the first wireless device be within a pre-defined distance, such as the area of a room that includes the set-top box device 104, or within a certain range, such as a class 2 Bluetooth range, in order to access media content requested in the viewing request. The set-top box device 104 can be adapted to determine whether to fulfill or deny the viewing request based on the first set of permissions.

If the set-top box 104 determines that the viewing request is to be denied based on the first set of permissions, the set-top box device 104 can determine whether a second wireless device is present at the user premises, such as the wireless device 112. If the set-top box device 104 detects the presence of the second wireless device at the user premises, the set-top box device 104 can be adapted to apply a second set of permissions associated with the wireless device 112 to the viewing request. For example, the set-top box device 104 can determine that the second permissions set requires that the wireless device 112 be within the relative proximity 122 of the set-top box device. The set-top box device 104 can be adapted to fulfill or deny the viewing request based on the second set of permissions. In one embodiment, the set-top box device 104 can be adapted to determine whether it is to override the first wireless device, the first set of permissions, or a combination thereof, based on the second set of permissions.

For example, the first wireless device and the wireless device 112 can be designated in a hierarchy associated with the permission policy. If the wireless device 112 is prioritized above the first wireless device in the hierarchy, the set-top box device 104 may determine that it is to override the first wireless device, the first set of permissions, or a combination thereof, based on the second set of permissions. In another embodiment, a wireless device, such as a cellular phone can be designated as a primary wireless device that overrides other wireless devices associated with the permission policy. The wireless devices can be of different types, can be associated with different users, or a combination thereof. For example, a first set of permissions can be applied when a parent's digital music player is within a room that includes the set-top box device, and a second set of permissions can be applied when the parent's cellular phone is within the room.

In an illustrative embodiment, each set-top box device at the user premises 102 can be adapted to control access to content independently based on the relative proximity of one or more relative devices to the particular set-top box device. For instance, the second set-top box device 108 can respond to viewing requests by sending its own polling signals and determining, for example, whether the wireless device 112 is present at the user premises 102 and within the room 116 or within another required relative proximity to the second set-top box device 108. Alternatively, a particular set-top box device at the user premises 102, such as the set-top box device 104 can act as a master set-top box device 104 and can determine relative proximities of one or more wireless devices to itself and to slave set-top box devices, such as the second set-top box device 108. The master set-top box device can communicate instructions to fulfill or deny viewing requests to slave set-top box devices based on its determinations of presence and relative proximity of wireless devices.

Figure 2:
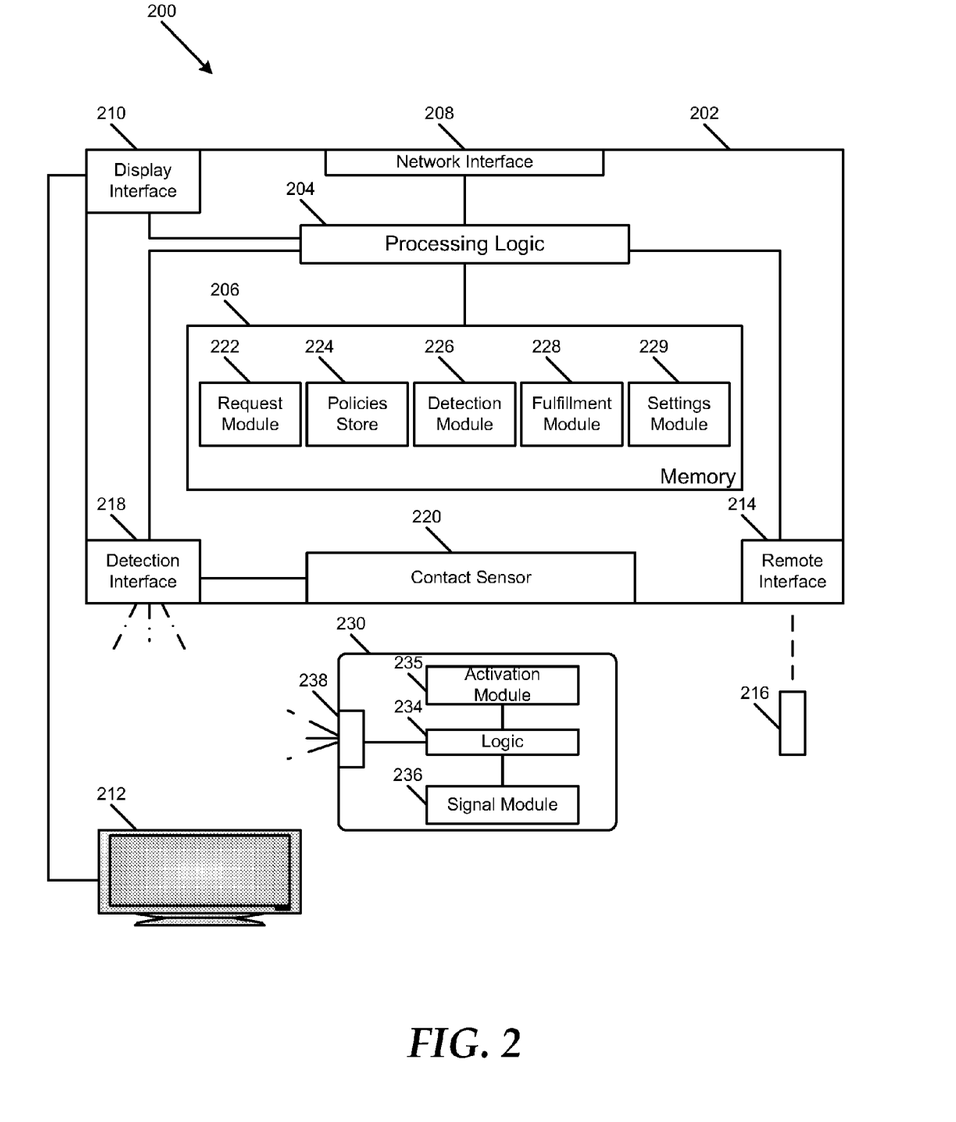
FIG. 2 is a block diagram illustrating a second particular embodiment of a system to control access to media content.

FIG. 2 shows a second particular embodiment of a system 200 to control access to media content. The system 200 includes a set-top box device 202 at a user premises. The set-top box 202 is adapted to communicate with at least one wireless device, such as the wireless device 230. The set-top box device 202 includes processing logic 204 and memory 206 accessible to the processing logic 204. Further, the set-top box device 202 includes a network interface 208 adapted to facilitate communication between the set-top box device 202 and a media distribution network, such as a cable network, satellite dish or network, or an Internet Protocol Television (IPTV) network. In one embodiment, the network interface 208 can also facilitate communication with one or more other set-top box devices at a user premises. In addition, the set-top box device 202 includes a display interface 210 adapted to communicate with a display device 212, such as a television monitor, and a remote interface 214 adapted to communicate with a remote control device 216.

In a particular embodiment, the set-top box device 202 includes a detection interface 218 that is adapted to communicate with one or more wireless devices, such as the wireless device 230, at the user premises. For example, the detection interface 218 can be adapted to send and receive signals with the wireless device 230. Such signals can include, for example, wireless fidelity (Wi-Fi) signals; wireless local area network (WLAN) signals; radio frequency identification (RFID) signals; cellular signals (e.g., the set-top box device can be adapted to act as a picocell device); Bluetooth signals (class 1, class 2, class 3, or a combination thereof); wireless access protocol (WAP) signals; or other currently known or later-developed signals. In one embodiment, the detection interface 218 can be adapted to send and receive a plurality of signal types. For example, the detection interface 218 can be adapted to send a signal having a broader range (e.g., RFID) to determine presence of the wireless device 230 at the user premises and to send a signal having a smaller range (e.g., class 2 Bluetooth) to determine relative proximity.

Further, the set-top box device 202 can include a contact sensor 220 adapted to receive or otherwise make contact with the wireless device 230. The contact sensor 220 can include electrical contacts, magnetic contacts, light-based sensors, or other sensing elements adapted to detect contact of the wireless device 230 at the set-top box device 202. The contact sensor 220 can be located, for example, on a top surface or other surface of the set-top box device 202. In an alternative embodiment, the contact sensor 220 can include a cradle or other device that is integrated with or coupled to the set-top box device 202. The contact sensor 220 can communicate with the detection interface 218, the processing logic 204, or a combination thereof, to indicate that the wireless device 230 is in contact with the set-top box device 202.

In a particular embodiment, the memory 206 includes a plurality of modules 222-230 that are adapted to implement various functions of the set-top box device 202 with respect to controlling access to media content. In one embodiment, the modules 222-230 represent instructions that are readable and executable by the processing logic 204. In other embodiments, the modules 222-230 can include instructions, hardware logic, or a combination thereof.

For example, the memory 206 can include a request module 222 that is executable by the processing logic 204 to receive a viewing request. The viewing request can be received via the remote control device 216, for example, and can include, for example, a request to power the set-top box device 202 on, a request to remove the set-top box device 202 from a standby state, a request to access a particular channel or a particular plurality of channels, a channel change request, a request to view a portion of an electronic programming guide, or any combination thereof. The request module 222 can be executable by the processing logic 204 to retrieve a permission policy stored at the policies store 224 in response to receiving the viewing request and to identify a wireless device associated with the permission policy, such as the wireless device 230. The wireless device 230 can include a cellular phone, a mobile phone, a digital music player, a security token device (e.g., a fob or other hardware device), a personal data assistant, a smart phone, a mobile computing device, other currently known or later-developed wireless devices, or any combination thereof.

The permission policy can define requirements to access certain media content via the set-top box device 202, where the requirements relate to relative proximities of one or more wireless devices, such as the wireless device 230, to the set-top box device 202. Relative proximities can include distances measured from the set-top box device 202, communication ranges measured from the set-top box device 202, lines of sight measured from the set-top box device 202, a contact area of the set-top box device 202, other relative proximities to the set-top box device 202, or any combination thereof.

For example, the permission policy can indicate that one or more base television channels, music channels, or a combination thereof (e.g., public broadcasting or children's channels), are accessible via the set-top box device 202, when the wireless device 230 is not present at the user premises. In another example, the permission policy may indicate that the set-top box device 202 is not to provide any media content while the wireless device 230 is not at the user premises. Further, the permission policy can indicate that one or more particular channels (e.g., major networks or adult contemporary music channels) are accessible when the wireless device 230 is present at the user premises and within a first relative proximity to the set-top box device 202, such as not within a line of sight, within a wireless fidelity (Wi-Fi) range, a wireless area network (WLAN) range, or a class 1 Bluetooth range (e.g., 100 meters).

In other examples, the permission policy can indicate that one or more additional channels (e.g., certain cable networks or popular music channels) are accessible when the wireless device 230 is present at the user premises and within a second relative proximity to the set-top box device 202, such as within a line of sight to the set-top box device 202, within a class 2 Bluetooth range (e.g., 10 meters) of the set-top box device 202, or within an area of a room that includes the set-top box device 202. Moreover, the permission policy can indicate that one or more other channels (e.g., video on demand or cable movie channels) are accessible when the wireless device 230 is present at the user premises and within a contact area of the set-top box device, such as contacting the contact sensor 220 or within a class 3 Bluetooth range (e.g., 1 meter) of the set-top box device 202.

The memory 206 includes a detection module 226 that is executable by the processing logic 204 to determine whether the identified wireless device 230 is present at the user premises. In an illustrative embodiment, the detection module 226 can be executable by the processing logic 204 to send a polling signal or other signal within a range that includes the user premises, according to a signaling protocol indicated by the permission policy for the wireless device 230. The signaling protocol can include, for example, Wi-Fi, Bluetooth, WLAN, cellular, wireless access protocol (WAP), radio frequency identification (RFID), other currently known or later-developed signaling protocols, or a combination thereof. In one embodiment, the set-top box device 202 can be adapted to act as a picocell device that can communicate with the wireless device 230 via cellular communication over a limited range. The detection module 226 can be executable by the processing logic 204 to determine a presence of the wireless device 230 at the user premises based on an acknowledgement or other response signal received from the wireless device 230 in response to the polling signal. Alternatively, the detection module 226 can be executable by the processing logic 204 to determine that the wireless device 230 is not present at the user premises if a response signal is not received within a pre-defined time after the polling signal or other signal is sent.

When the wireless device 230 is present at the user premises, the detection module 226 can be executable by the processing logic 204 to determine a relative proximity of the wireless device 230 to the set-top box device 202. The detection module 226 can be executable by the processing logic 204 to determine a relative proximity of the wireless device 230 according to any appropriate means. In one example, the detection module 226 can be executable by the processing logic 204 to determine the relative proximity of the wireless device 230 based at least partially on a time between the polling signal is sent and a response signal is received by the set-top box device 202 from the wireless device 230. In another example, the detection module 226 can be executable by the processing logic 204 to determine the relative proximity of the wireless device 230 based on a type of signal sent by the set-top box device 202.

For instance, the detection module 226 can be executable by the processing logic 204 to determine that the wireless device 230 is within a first relative proximity, if the set-top box device 202 receives a signal from the wireless device 230 in response to a RFID signal, a Wi-Fi signal, a class 1 Bluetooth signal, or another signal sent by the set-top box device 202. Further, the detection module 226 can be executable by the processing logic 204 to determine that the wireless device 230 is within a second relative proximity to the set-top box device that is smaller than the first relative proximity based on a signal received from the wireless device 230 in response to a class 2 Bluetooth signal or a wireless local area network (WLAN) signal sent by the set-top box device 202. In addition, the detection module 226 can be executable by the processing logic 204 to determine that the wireless device 230 is within a third relative proximity to the set-top box device 202 that is smaller than the first and second relative proximities based on a signal received from the wireless device 230 in response to a class 3 Bluetooth signal sent by the set-top box device 202 or based on contact between the set-top box device 202 and the wireless device 230.

The memory 206 includes a fulfillment module 228 that is executable by the processing logic 204 to determine whether the relative proximity of the wireless device 230 to the set-top box device 202 is within a relative proximity required by the permission policy to fulfill the viewing request. The fulfillment module 228 is executable by the processing logic 204 to fulfill a viewing request when the wireless device 230 is within a relative proximity that is required by the permission policy for the media content designated in the viewing request. The fulfillment module 228 is executable by the processing logic 204 to deny a viewing request when the wireless device 230 is not within a relative proximity that is required by the permission policy for the media content designated in the viewing request, even if the wireless device 230 is present at the user premises. In an illustrative embodiment, the fulfillment module 228 is executable by the processing logic 204 to send a blank screen to the display device 212 when a viewing request is not fulfilled. In another embodiment, the fulfillment module 228 is executable by the processing logic 204 to send an error message or a message indicating that access is not authorized to the display device 212.

The fulfillment module 228 can be executable by the processing logic 204 to not fulfill a viewing request when the wireless device 230 or another wireless device associated with the permission policy is not present at the user premises. In another embodiment, the permission policy stored at the policies store 224 can include a base level of permissions that indicates that certain media content, such as public broadcasting or cartoon content, is accessible when the wireless device 230 is not present at the user premises. In this embodiment, the fulfillment module 228 can be executable by the processing logic 204 to fulfill the viewing request prior to the set-top box device 202 sending a polling signal or other signal, when the viewing request does not exceed the base level of permissions.

In another particular embodiment, the wireless device 230 can be one of a plurality of wireless devices associated with the permission policy stored at the policies store 224. The detection module 226 can be executable by the processing logic 204 to determine whether a first wireless device is present at the user premises and, when the first wireless device is present, to determine a relative proximity of the first wireless device to the set-top box device 202. When the first wireless device is present at the user premises, the fulfillment module 228 can be executable by the processing logic 204 to apply a first set of permissions associated with the first wireless device to the viewing request. For example, the first permissions set can require that the first wireless device be within a pre-defined distance, such as the area of a room that includes the set-top box device 202, in order to access media content requested in the viewing request. The fulfillment module 228 can be executable by the processing logic 204 to determine whether to fulfill or deny the viewing request based on the first set of permissions.

If the viewing request is to be denied based on the first set of permissions, the detection module 226 can be executable by the processing logic 204 to determine whether a second wireless device, such as the wireless device 230, is present at the user premises and, when the wireless device 230 is present, to determine a relative proximity of the wireless device 230 to the set-top box device 202. When the wireless device 230 is present at the user premises, the fulfillment module 228 can be executable by the processing logic 204 to apply a second set of permissions associated with the wireless device 230 to the viewing request. For example, the second permissions set can require that the second wireless device contact or be within a pre-defined distance of the contact sensor 220 of the set-top box device 202 in order to access media content designated in the viewing request. The fulfillment module 228 can be executable by the processing logic 204 to fulfill or deny the viewing request based on the second set of permissions.

In one embodiment, the fulfillment module can be executable by the processing logic 204 to determine whether it is to override the first wireless device, the first set of permissions, or a combination thereof, based on the second set of permissions when the wireless device 230 is present. For example, a plurality of wireless devices can be designated in a hierarchy associated with the permission policy. In another embodiment, a wireless device, such as a cellular phone can be designated as a primary wireless device that overrides other wireless devices associated with the permission policy. The wireless devices can be of different types, can be associated with different users, or a combination thereof. For example, a first set of permissions can be applied when a parent's digital music player is within a room that includes the set-top box device, and a second set of permissions can be applied when the parent's cellular phone is within the room.

The memory 206 includes a settings module 229 that is executable by the processing logic 204 to receive a request to alter settings associated with the permission policy, such as relative proximities, media content limitations, wireless devices, other settings, or a combination thereof. In response to a request to change settings, the detection module 226 can be executable by the processing logic 204 to determine a relative proximity of a wireless device associated with the permission policy, such as the wireless device 230, before allowing changes to be made. For example, the permission policy may indicate that the wireless device 230 must be within a contact area of the set-top box device 202 (e.g., contacting the contact sensor, within a pre-defined distance, or within a class 1 Bluetooth range), for settings to be accessed, changed, or a combination thereof. The settings module 229 can deny a request to change settings associated with the permission policy when the wireless device 230 is not within the required relative proximity, and to accept changes and store the changes to the policies store 224 when the wireless device 230 is within the required relative proximity In a particular embodiment, the wireless device 230 can include logic 234, such as a processor. Further, the wireless device 230 includes a plurality of modules 235-236 that are adapted to implement various functions of the wireless device 230 with respect to controlling access to media content. In one embodiment, the modules 235-236 represent instructions that are readable and executable by the logic 234. In other embodiments, the modules 235-236 can be instructions, controls or other hardware elements, or a combination thereof.

For example, the wireless device 230 can include an activation module 235 that is executable by the logic 234 to activate or deactivate a content control function at the wireless device. For example, the activation module 235 can be executable by the logic 234 to receive input via a graphical user interface shown at a display of the wireless device 230, where the input indicates that the content control function is to be activated or deactivated. In another example, the activation module 235 can be a switch, button, or other control of the wireless device, which can be manipulated by a user to activate or deactivate the content control function.

In addition, the wireless device 230 includes a signal module 236 that is executable by the logic 234 to send and receive signals with the set-top box device 202 via a signal interface 238. For instance, when the content control function is activated at the wireless device 230, the wireless device 230 can listen for and respond to signals from the set-top box device 202. Response signals can be used by the set-top box device 202 to determine whether a relative proximity of the wireless device 230 to the set-top box device 202 satisfies a relative proximity required by the permission policy to fulfill a viewing request received at the set-top box device 202.

Figure 3:
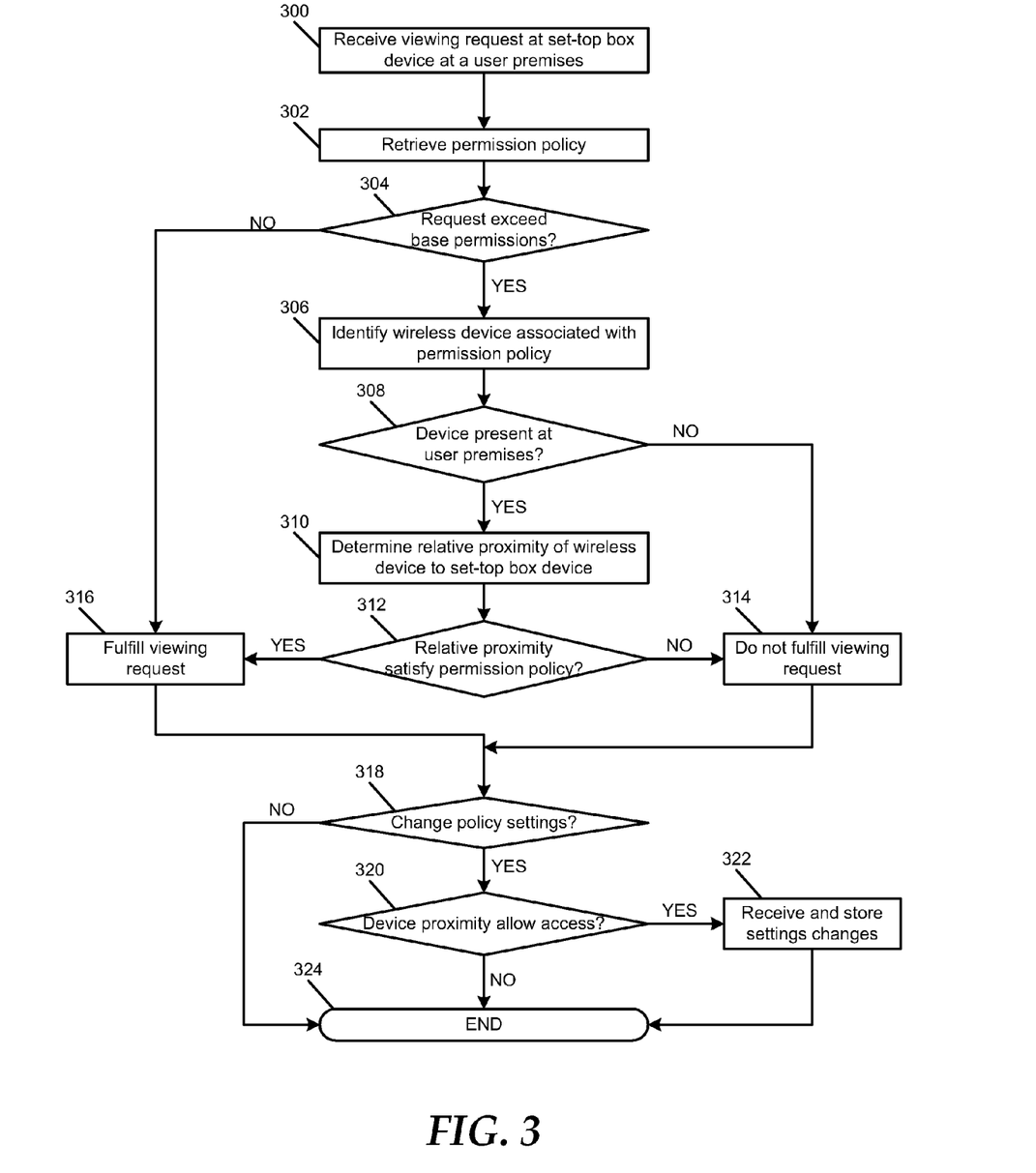
FIG. 3 is a flow diagram illustrating a particular embodiment of a method of controlling access to media content.

FIG. 3 shows a particular embodiment of a method of controlling access to media content. At block 300, a set-top box device at a user premises receives a viewing request. The viewing request can include, for example, a request to power the set-top box device on, a request to remove the set-top box device from a standby state, a channel change request, a request to view a portion of an electronic programming guide, or any combination thereof. Moving to block 302, the set-top box device retrieves a permission policy stored at the set-top box device. Proceeding to decision node 304, the set-top box device determines whether the request exceeds a base level of permissions associated with the permission policy. For example, a base level of permissions may allow the set-top box device to be powered on and to access one or more base channels designated by the user (e.g., PBS, a cartoon channel, or other channels).

If the set-top box device determines that the viewing request does not exceed the base level of permissions associated with the permission policy stored at the set-top box device, the method advances to block 316, and the set-top box device fulfills the viewing request. Conversely, if the set-top box device determines that the viewing request exceeds the base level of permissions (e.g., by requesting a restricted television or music channel that is designated by a user), the method continues to block 306, and the set-top box device identifies a wireless device associated with the permission policy. The identified wireless device can be one of a plurality of wireless devices associated with the permission policy.

At decision node 308, the set-top box device determines whether the identified wireless device is present at the user premises. In an illustrative embodiment, the set-top box device can send a polling signal or other signal within a range that includes the user premises. The polling signal can be sent according to a signaling protocol indicated by the permission policy for the wireless device. The set-top box device can determine a presence of the wireless device at the user premises based on an acknowledgement or other response signal from the wireless device in response to the polling signal. Alternatively, the set-top box device can determine that the wireless device is not present at the user premises if a response signal is not received within a pre-defined time after the polling signal is sent. If the set-top box device determines that the wireless device is not present at the user premises, the method can move to block 314, and the set-top box device does not fulfill the viewing request. On the other hand, if the set-top box device determines that the wireless device is present at the user premises, the method proceeds to block 310, and the set-top box device determines a relative proximity of the wireless device to the set-top box device.

Continuing to decision node 312, the set-top box device determines whether the relative proximity of the wireless device to the set-top box device is within a relative proximity required by the permission policy to fulfill the viewing request. For example, the permission policy can require that the wireless device be within a room including the set-top box device in order to grant access to a particular channel. If the wireless device is not within the required relative proximity, the method advances to block 314, and the set-top box device does not fulfill the viewing request. The method then moves to decision node 318. Returning to decision node 312, if the wireless device is within the required relative proximity, the method advances to block 316, and the set-top box device fulfills the viewing request. The method then moves to decision node 318.

At decision node 318, in a particular embodiment, the set-top box device can determine whether it has received a request to change settings associated with the permission policy, such as designations of restricted channels, wireless devices, relative proximities, other settings, or any combination thereof. If the set-top box device does not receive a request to change settings associated with the permission policy, the method terminates at 324. Conversely, if the set-top box device receives a request to change settings associated with the permission policy, the method proceeds to decision node 320, and the set-top box determines whether the relative proximity of the wireless device is within a relative proximity required by the permission policy to change such settings. In one embodiment, the set-top box device can send a polling signal to the wireless device in response to the request to change settings. If the wireless device is within the required relative proximity to change settings associated with the permission policy, the set-top box device can receive and store changes to the settings, at block 322. The method terminates at 324.

Figure 4:
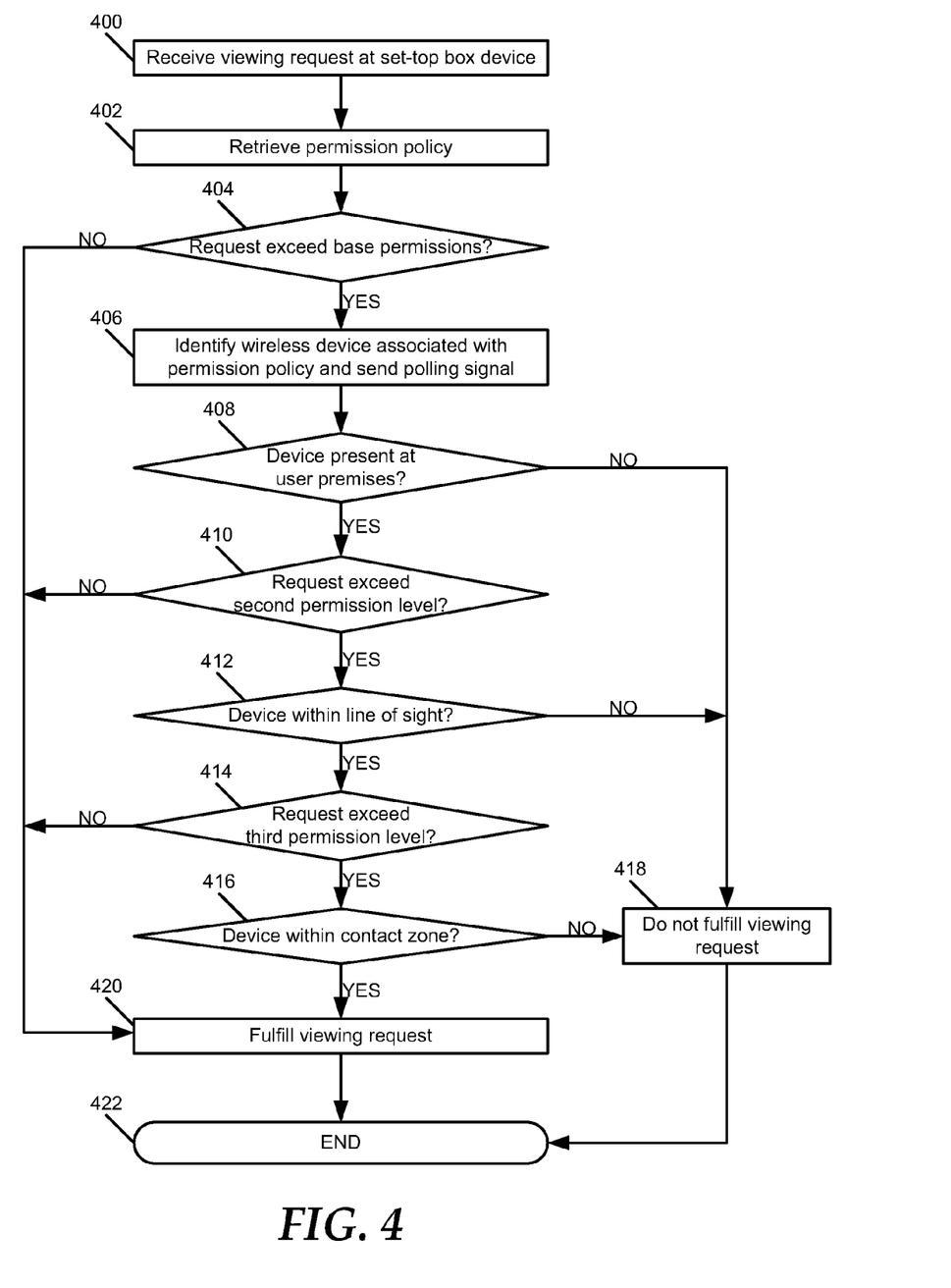
FIG. 4 is a flow diagram illustrating a second particular embodiment of a method of controlling access to media content.

FIG. 4 shows a second particular embodiment of a method of controlling access to media content. At block 400, a set-top box device at a user premises receives a viewing request. Moving to block 402, the set-top box device retrieves a permission policy stored at the set-top box device. Proceeding to decision node 404, the set-top box device determines whether the request exceeds a base level of permissions associated with the permission policy. If the set-top box device determines that the viewing request does not exceed the base level of permissions associated with the permission policy stored at the set-top box device, the method advances to block 420, and the set-top box device fulfills the viewing request. Conversely, if the set-top box device determines that the viewing request exceeds the base level of permissions (e.g., by requesting a restricted television or music channel that is designated by a user), the method continues to block 406, and the set-top box device identifies a wireless device associated with the permission policy and sends a polling signal. The identified wireless device can be one of a plurality of wireless devices associated with the permission policy.

At decision node 408, the set-top box device determines whether the identified wireless device is present at the user premises. In an illustrative embodiment, the set-top box device can determine a presence of the wireless device at the user premises based on an acknowledgement or other response signal from the wireless device in response to the polling signal. Alternatively, the set-top box device can determine that the wireless device is not present at the user premises if a response signal is not received within a pre-defined time after the polling signal is sent. If the set-top box device determines that the wireless device is not present at the user premises, the method can move to block 418, and the set-top box device does not fulfill the viewing request. The method can then terminate at 422.

Returning to decision node 408, if the set-top box device determines that the wireless device is present at the user premises, the method proceeds to decision node 410, and the set-top box device determines whether the viewing request exceeds a second level of permissions that is higher (i.e., more restrictive) than the base permissions associated with the permission policy. If the viewing request does not exceed the second level of permissions, the method can advance to block 420, and the set-top box device can fulfill the viewing request.

For instance, the second level of permissions can indicate that access is to be granted to one or more channels that are not accessible according to the base permissions, but are accessible when the wireless device is present at the user premises.

If the set-top box device determines that the viewing request exceeds the second level of permissions associated with the permission policy, the method continues to decision node 412, and the set-top box device can determine whether the wireless device is within a required relative proximity to the set-top box device, such as within a line of sight of the set-top box device. If the wireless device is not within the required relative proximity, the method can move to block 418, and the set-top box device does not fulfill the viewing request. Conversely, if the wireless device is within the required relative proximity to the set-top box device, such as within a line of sight, the method can proceed to decision node 414. At decision node 414, the set-top box device can determine whether the viewing request exceeds a third level of permissions associated with the permission policy. For instance, the third level of permissions can indicate that access is to be granted to one or more channels that are not accessible according to the base level or second level of permissions, but are accessible when the wireless device is within a line of sight or other required relative proximity If the viewing request does not exceed this third level of permissions, the method can advance to block 420, and the set-top box device can fulfill the viewing request.

On the other hand, if the set-top box determines that the viewing request exceeds the third level of permissions associated with the permission policy, the method moves to decision node 416, and the set-top box device can determine whether the wireless device is within a contact area of the set-top box device. For instance, the permission policy may indicate that all available channels, including channels that are not accessible under the base level, second level and third level of permissions, are accessible when the wireless device is within the contact area. The contact area can include actual contact between the wireless device and the set-top box device, a close relative proximity designated by the user or the set-top box device (e.g., one meter or within a class 3 Bluetooth range), or a combination thereof. If the set-top box device determines that the wireless device is not within the contact area, the set-top box device does not fulfill the viewing request, at block 418. Whereas, if the set-top box device determines that the wireless device is within the contact area, the set-top box device can fulfill the viewing request, at block 420. The method terminates at 422.

Figure 5:
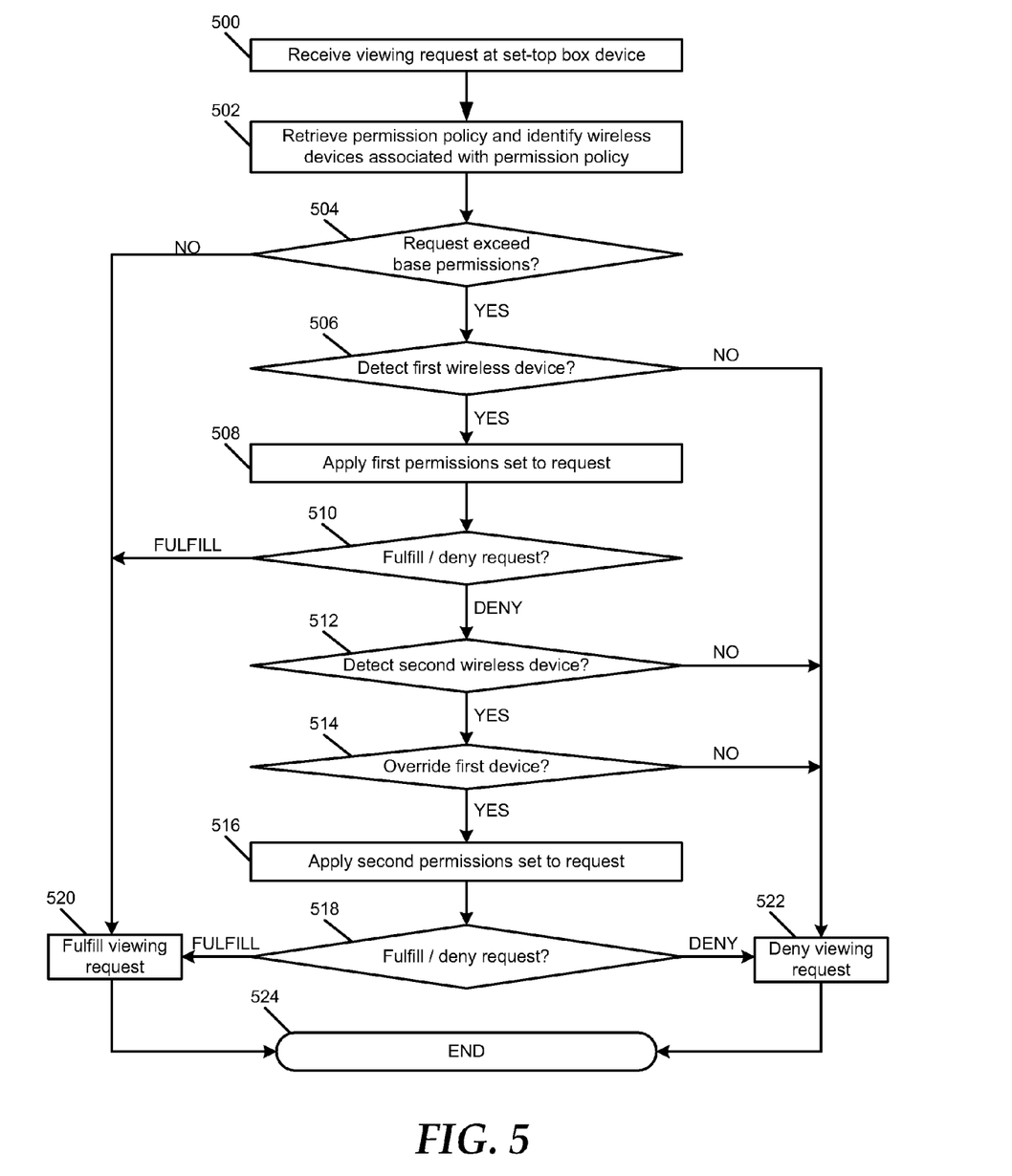
FIG. 5 is a flow diagram illustrating a third particular embodiment of a method of controlling access to media content.

FIG. 5 shows a third particular embodiment of a method of controlling access to media content. At block 500, a set-top box device at a user premises receives a viewing request. Moving to block 502, the set-top box device retrieves a permission policy stored at the set-top box device and identifies a wireless device associated with the permission policy and sends a polling signal. The identified wireless device can be one of a plurality of wireless devices associated with the permission policy. At decision node 504, the set-top box device determines whether the viewing request exceeds a base level of permissions associated with the permission policy.

If the set-top box device determines that the viewing request does not exceed the base level of permissions associated with the permission policy stored at the set-top box device, the method advances to block 520, and the set-top box device fulfills the viewing request. Conversely, if the set-top box device determines that the viewing request exceeds the base level of permissions (e.g., by requesting a restricted television or music channel that is designated by a user), the method continues to decision node 506, and the set-top box device can determine whether it detects a first wireless device at the user premises. If the set-top box device does not detect the presence of the first wireless device, the method can move to block 522, and the set-top box device can deny the viewing request. On the other hand, if set-top box detects the presence of the first wireless device at the user premises, the method proceeds to block 508, and the set-top box device can apply a first set of permissions to the viewing request.

For example, the set-top box device can determine that the first permissions set requires that the first wireless device be within a pre-defined distance, such as the area of a room that includes the set-top box device, or within a certain range, such as a class 2 Bluetooth range, in order to access a channel requested in the viewing request. Continuing to decision node 510, the set-top box device determines whether to fulfill or deny the viewing request based on the first set of permissions. If the set-top box determines that the viewing request is to be fulfilled, the method moves to block 520, and the set-top box device fulfills the viewing request. Whereas, if the set-top box determines that the viewing request is to be denied, the method moves to decision node 512.

At decision node 512, the set-top box device can determine whether it detects a second wireless device at the user premises. If the set-top box device does not detect the presence of the second wireless device, the method can move to block 522, and the set-top box device can deny the viewing request. On the other hand, if the set-top box detects the presence of the second wireless device at the user premises, the method proceeds to decision node 514, and the set-top box device determines whether it is to override the first permissions set associated with the first wireless device based on a relative proximity of the second wireless device. If the set-top box device determines that it is not to override the first permissions set, based on a wireless device hierarchy or other setting previously designated by a user, the method advances to block 522, and the set-top box device denies the viewing request.

Conversely, if the set-top box device determines that it is to override the first permissions set, the method advances to block 516, and the set-top box device can apply a second set of permissions to the viewing request. For example, the set-top box device can determine that the second permissions set requires that the second wireless device be within a pre-defined distance, such as a contact area of the set-top box device, or within a certain range, such as a class 3 Bluetooth range, in order to access a channel requested in the viewing request. Proceeding to decision node 518, the set-top box device determines whether to fulfill or deny the viewing request based on the second set of permissions. If the set-top box determines that the viewing request is to be fulfilled, the method moves to block 520, and the set-top box device fulfills the viewing request. Whereas, if the set-top box determines that the viewing request is to be denied, the method moves to block 522, and the set-top box device denies the viewing request. The method terminates at 524.

In some embodiments, the method described with reference to FIG. 5 can be performed with more than two wireless devices, where a permissions set is associated with each wireless device. The wireless devices can be of different types, can be associated with different users, or a combination thereof. For example, a first set of permissions can be applied when a parent's digital music player is within a room that includes the set-top box device, and a second set of permissions can be applied when the parent's cellular phone is within the room. In one embodiment, wireless devices can be designated in a hierarchy associated with a permission policy. In another embodiment, a wireless device, such as a cellular phone can be designated as a primary wireless device that overrides other wireless devices associated with the permission policy.

Figure 6:
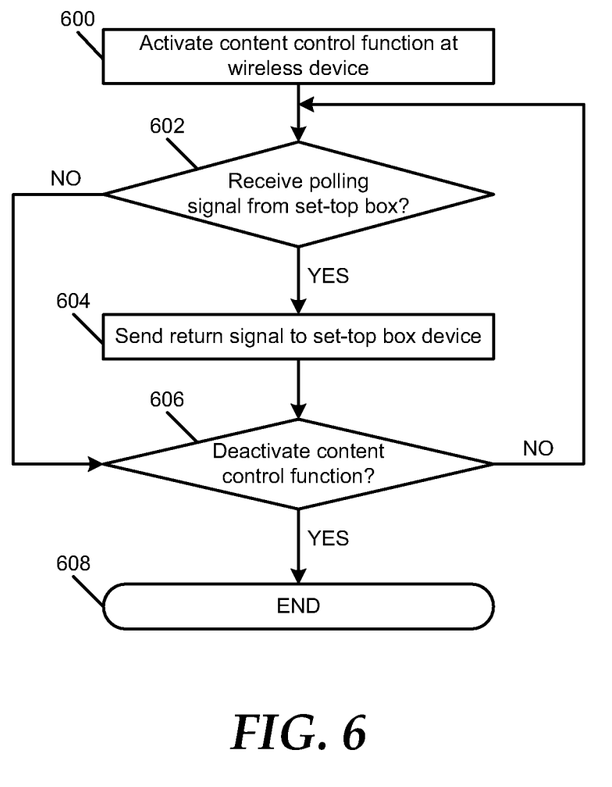
FIG. 6 is a flow diagram illustrating a fourth particular embodiment of a method of controlling access to media content.

FIG. 6 shows a fourth particular embodiment of a method of controlling access to media content. At block 600, a wireless device activates a content control function. For instance, a user of the wireless device can manipulate a control on the wireless device or select the function via a graphical user interface of the wireless device. Moving to decision node 602, the wireless device can determine whether it has received a polling signal or other signal from a set-top box device at a user premises. If the wireless device has not received a polling signal or other signal, the method can proceed to decision node 606. Conversely, if the wireless device has received a polling signal or other signal, the method continues to block 604, and the wireless device sends a return signal or other response to the set-top box device.

In a particular embodiment, the return signal is usable by the set-top box device to determine a relative proximity of the wireless device to the set-top box device. The set-top box device can be adapted to fulfill a viewing request when the wireless device is within a first relative proximity at the user premises and to deny the viewing request when the wireless device is within a second relative proximity at the user premises.

Advancing to decision node 606, the wireless device can determine whether it is to deactivate the content control function at the wireless device. If the wireless device determines that it is not to deactivate the content control function at the wireless device, the method can return to decision node 602. On the other hand, if the wireless device determines that it is to deactivate the content control function at the wireless device, the method terminates at 608.

In some embodiments, the methods disclosed herein may be performed as described. In other embodiments, some aspects of the methods can be performed in sequences other than those described, or simultaneously. For example, in one embodiment, a set-top box device may determine presence and relative proximity of one or more wireless devices simultaneously.

Figure 7:
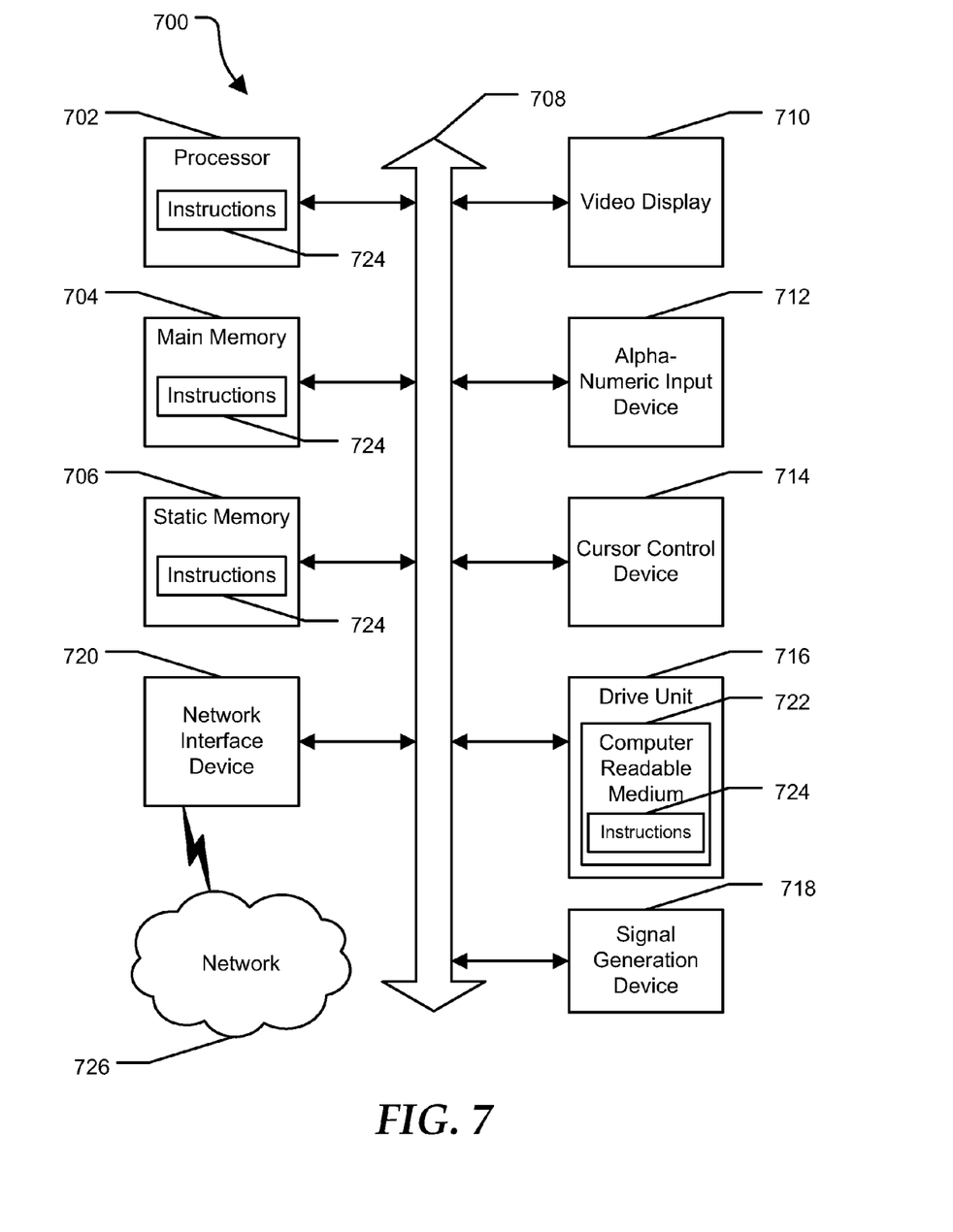
FIG. 7 is a diagram illustrating a particular embodiment of a general computer system.

FIG. 7 shows an illustrative embodiment of a general computer 700 including a set of instructions that can be executed to cause the computer system to perform any one or more of the methods or computer based functions disclosed herein. The computer system 700 may operate as a standalone device or may be connected, e.g., using a network, to other computer systems or peripheral devices. In an illustrative embodiment, such standalone and peripheral devices can include, for example, set-top box devices and wireless devices, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
receiving, by a mobile communication device, a polling signal from a set-top box device;
sending, by the mobile communication device, a response signal to the set-top box device responsive to receiving the polling signal, wherein the sending of the response signal causes the set-top box device to determine a relative proximity of the mobile communication device to the set-top box device according to a time between the polling signal and the response signal; and
sending, by the mobile communication device, a viewing request associated with media content of the set-top box device, wherein the sending of the viewing request causes the set-top box device to process the viewing request according to the relative proximity and a permission policy of the set-top box device,
wherein the relative proximity corresponds to: being inside a premises but outside a room of the premises where the set-top box device is located if the mobile communication device is beyond a range of a first short range signaling protocol communications link of the set-top box device; being in contact with the set-top box device if the mobile communication device is within a range of a second short range signaling protocol communications link of the set-top box device; and being inside the room of the premises where the set-top box device is located if the mobile communication device is within a line of sight of the set-top box device,
wherein the viewing request is not fulfilled by the set-top box device if the set-top box device determines that the mobile communication device is not present at the premises where the set-top box is located, and
wherein the viewing request is fulfilled by the set-top box device if the set-top box device determines that the relative proximity does not exceed a communication range identified by the permission policy.

2. The method of claim 1, wherein the viewing request comprises a power-on request.

3. The method of claim 1, wherein the viewing request comprises a request to remove the set-top box device from a standby state.

4. The method of claim 1, wherein the viewing request comprises a request to access a particular channel or a particular plurality of channels.

5. The method of claim 1, wherein the viewing request comprises a channel change request.

6. The method of claim 1, wherein the viewing request comprises a request to view a portion of an electronic programming guide.

7. The method of claim 1, wherein the viewing request comprises one of a power-on request, a request to remove the set-top box device from a standby state, a request to access a particular channel or a particular plurality of channels, a channel change request, a request to view a portion of an electronic programming guide, or a combination thereof.

8. The method of claim 1, further comprising:
deactivating a first function of a plurality of functions of the mobile communication device for controlling content of the set-top box device;
receiving a second polling signal from the set-top box; and
activating the first function of the mobile communication device responsive to receiving the second polling signal.

9. A mobile communication device, comprising:
a memory to store computer instructions; and
a processor coupled to the memory, wherein the processor, responsive to executing the computer instructions, performs operations comprising:
receiving a polling signal from a set-top box device;
sending a response signal to the set-top box device responsive to receiving the polling signal, wherein the sending of the response signal causes the set-top box device to determine a relative proximity of the mobile communication device to the set-top box device according to a time between the polling signal and the response signal; and
sending a viewing request associated with media content of the set-top box device, wherein the sending of the viewing request causes the set-top box device to process the viewing request according to the relative proximity and a permission policy of the set-top box device,
wherein the relative proximity corresponds to: being inside a premises but outside a room of the premises where the set-top box device is located if the mobile communication device is beyond a range of a first short range signaling protocol communications link of the set-top box device; being in contact with the set-top box device if the mobile communication device is within a range of a second short range signaling protocol communications link of the set-top box device; and being inside the room of the premises where the set-top box device is located if the mobile communication device is within a line of sight of the set-top box device,
wherein the viewing request is not fulfilled by the set-top box device if the set-top box device determines that the mobile communication device is not present at the premises where the set-top box is located, and
wherein the viewing request is fulfilled by the set-top box device if the set-top box device determines that the relative proximity does not exceed a communication range identified by the permission policy.

10. The mobile communication device of claim 9, wherein the operations further comprise:
deactivating a first function of a plurality of functions of the mobile communication device for controlling content of a set-top box device;
activating the first function of the mobile communication device responsive to receiving the polling signal;
presenting a graphical user interface for receiving an input selection corresponding to the first function; and
receiving the input selection corresponding to the first function at the mobile communication device, wherein the sending of the viewing request is responsive to the receiving of the input selection.

11. The mobile communication device of claim 9, wherein the viewing request comprises a request to access a particular channel or a particular plurality of channels.

12. The mobile communication device of claim 9, wherein the operations further comprise communicating with the set-top box device via a wireless communication signal.

13. The mobile communication device of claim 9, wherein the viewing request comprises one of a power-on request, a request to remove the set-top box device from a standby state, a request to access a particular channel or a particular plurality of channels, a channel change request, a request to view a portion of an electronic programming guide, or a combination thereof.

14. The mobile communication device of claim 9, wherein the viewing request is fulfilled by the set-top box device if the set-top box device determines that the media content associated with the viewing request does not exceed a permission level identified by the permission policy.

15. The mobile communication device of claim 9, wherein the first short range signaling protocol communications link is a class 2 Bluetooth communications link of the set-top box device.

16. The mobile communication device of claim 9, wherein the second short range signaling protocol communications link is a class 2 Bluetooth communications link of the set-top box device.

17. A non-transitory computer-readable storage device comprising computer instructions which when executed by a processor of a mobile communication device cause the processor to perform operations comprising:
    receiving a polling signal from a set-top box device;
    sending a response signal to the set-top box device responsive to receiving the polling signal, wherein the sending of the response signal causes the set-top box device to determine a relative proximity of the mobile communication device to the set-top box device according to a time between the polling signal and the response signal; and
    sending a viewing request associated with media content of the set-top box device, wherein sending the viewing request causes the set-top box device to process the viewing request according to the relative proximity and a permission policy of the set-top box device,
    wherein the relative proximity corresponds to: being inside a premises but outside a room of the premises where the set-top box device is located if the mobile communication device is beyond a range of a first short range signaling protocol communications link of the set-top box device; being in contact with the set-top box device if the mobile communication device is within a range of a second short range signaling protocol communications link of the set-top box device; and being inside the room of the premises where the set-top box device is located if the mobile communication device is within a line of sight of the set-top box device,
    wherein the viewing request is not fulfilled by the set-top box device if the set-top box device determines that the mobile communication device is not present at the premises where the set-top box is located, and
    wherein the viewing request is fulfilled by the set-top box device if the set-top box device determines that the relative proximity does not exceed a communication range identified by the permission policy.

18. The non-transitory computer-readable storage device of claim 17, wherein the operations further comprise:
    deactivating a first function of a plurality of functions of the mobile communication device for controlling content of the set-top box device;
    receiving a second polling signal from the set-top box; and
    activating the first function of the mobile communication device responsive to receiving the second polling signal.

19. The non-transitory computer-readable storage device of claim 17, wherein the viewing request is fulfilled by the set-top box device if the set-top box device determines that the viewing request does not exceed a permission level identified by the permission policy.

20. The non-transitory computer-readable storage device of claim 17, wherein the viewing request comprises one of a power-on request, a request to remove the set-top box device from a standby state, a request to access a particular channel or a particular plurality of channels, a channel change request, a request to view a portion of an electronic programming guide, or a combination thereof.

* * * * *